(12) United States Patent
Brostmeyer

(10) Patent No.: US 7,743,609 B1
(45) Date of Patent: Jun. 29, 2010

(54) POWER PLANT WITH ENERGY STORAGE DEEP WATER TANK

(75) Inventor: Joseph Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 373 days.

(21) Appl. No.: 12/026,574

(22) Filed: Feb. 6, 2008

(51) Int. Cl.
*F16D 31/02* (2006.01)
(52) U.S. Cl. .................................................. 60/398
(58) Field of Classification Search .............. 60/398; 290/43, 54
See application file for complete search history.

(56) References Cited
U.S. PATENT DOCUMENTS 3,677,008 A * 7/1972 Koutz .......................... 60/398
3,895,493 A * 7/1975 Rigollot ....................... 60/398
3,996,741 A * 12/1976 Herberg ....................... 60/398
7,281,371 B1 * 10/2007 Heidenreich .................. 60/398

* cited by examiner

Primary Examiner—Michael Leslie
(74) Attorney, Agent, or Firm—John Ryznic

(57) ABSTRACT

A power plant that is used for storing energy during a low demand and returning the energy to a power plant during high or peak demand. A concrete tank is placed on the bottom of a deep body of water. A compressed air line connects the tank to a compressor and turbine assembly on land at the power plant. An electric motor drives the compressor to supply compressed air to the tank and displace the water within the tank during the low demand period. At high demand, the compressed air is allowed to flow through the turbine that drives an electric generator to produce electric power. The tank includes a water outlet pipe for the tank is displaced of the high pressure water and to allow the water to flow into the tank and displace the compressed air under high pressure to drive the turbine.

8 Claims, 1 Drawing Sheet ly, the dempressed air to the air cavity to displace water from the cavern

POWER PLANT WITH ENERGY STORAGE DEEP WATER TANK

FEDERAL RESEARCH STATEMENT

None.

CROSS-REFERENCE TO RELATED APPLICATIONS

This application is related to a co-pending U.S. regular utility application Ser. No. 12/026,571 filed on 6 Feb. 2008 and entitled POWER PLANT WITH ENERGY STORAGE DEEP WATER TANK.

BACKGROUND OF THE INVENTION

1. Field of the Invention

The present invention relates generally to power plants, and more specifically to an energy storage tank for storing of energy in a deep water environment.

2. Description of the Related Art including information disclosed under 37 CFR 1.97 and 1.98

An electrical generating power plant for a city produces power in a turbine to provide electricity to various places. During a hot summer day, the demand for electrical power can be greater than the power plant is able to produce. During night, the demand for electrical power could be lower than the minimum electrical power that the plant is producing without shutting down. In the case of a nuclear power plant, the reactor cannot be shut down overnight.

Some prior art patents disclose inventions that attempt to address the above concern. U.S. Pat. No. 4,808,029 issued to Grupping on Feb. 28, 1989 entitled SYSTEM FOR SUBTERRANEAN STORAGE OF ENERGY discloses a system that uses abandoned salt caverns to store energy that is inputted from a power plant during low demand and withdrawals the stored energy when the demand is high. A liquid flows between two caverns that are at different elevations in order to produce a large pressure gradient between the caverns. The liquid is pumped into the highest cavern to store energy, and allowed to fall into the lower tank and through a turbine when energy is withdrawn. This type of energy storage requires two large reservoirs that are spaced at different heights. If a storage tank was to be used in place of the cavern, the tank would need to be strong enough to hold the high pressure liquid.

U.S. Pat. No. 4,092,828 issued to Garza on Jun. 6, 1978 entitled HYDROELECTRIC PLANT discloses a hydroelectric power plant operated by wave action and supported on an ocean floor. A cylindrical tank is used to form a reservoir for the sea water. The relatively high pressure water at the ocean floor is allowed to flow through a turbine and into an atmospheric pressure reservoir to drive a generator. Water is pumped out of the atmospheric reservoir by a pump driven by the up and down motion of the waves. This system is not an energy storage device that could be used to store extra electric power production during low demand, and then use the stored energy to produce electric power at high demand.

U.S. Pat. No. 3,677,008 issued to Koutz on Jul. 18, 1972 entitled ENERGY STORAGE SYSTEM AND METHOD discloses a system with a cavern below the surface connected to an above-ground lake by a water pipe, where the cavern has a ceiling that forms an air cavity. An air pipe connects the air cavity to a compressor and turbine power plant. High pressure developed in the cavern compresses the air in the cavity due to the height difference in the water levels between the lake and the cavern. The compressed air is driven through the turbine to generate electric power. The compressor supplies compressed air to the air cavity to displace water from the cavern to the lake for storage of energy. In this system, the motive fluid that drives the turbine is compressed air. Also, the system requires a large cavern to store the compressed air.

BRIEF SUMMARY OF THE INVENTION

It is an object of the present invention to provide for an object of the present invention to provide for a power plant with the capability of storing energy during low demands periods for use during high demand periods so that the power plant does not have to be shut down or reduced in the power output.

It is another object of the present invention to provide for a high pressure storage tank that can be placed on a bottom of a deep body of water for use in the power plant.

The present invention is a power plant that includes an energy storage system that stores energy at low loads and releases energy at peak loads. The system includes a storage tank formed of steel reinforced concrete that is placed in a body of deep water. The storage tank is capable of withstanding the high pressure from the water depths. During the energy storage phase, compressed air is supplied to the storage tank to displace water from inside. When the stores energy is to be released, water from the deep is allowed to flow into the storage tank through a turbine to drive an electrical generator. Because the inside of the storage tank is at atmospheric pressure and the storage tank is in deep water, a high pressure gradient exists to drive the turbine. Because the storage tank is made from concrete, it is capable of withstanding the high pressure from the deep water in order to provide the relatively low pressure inside. Also, the storage tank can be easily fabricated such that a very large storage tank can be made. Thus, a large amount of energy can be stored for use at peak demand.

DETAILED DESCRIPTION OF THE INVENTION

Figure 1:
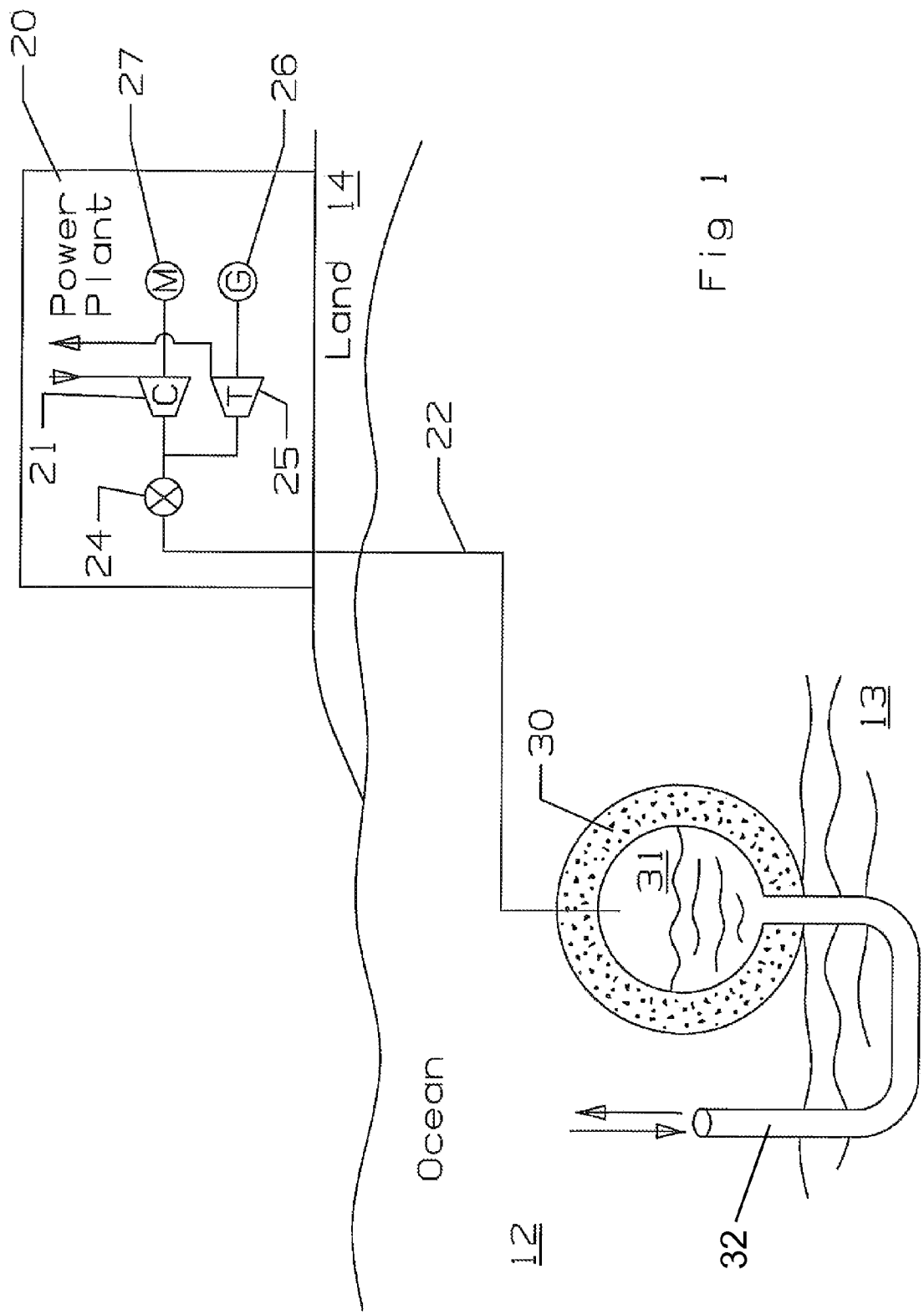
FIG. 1 shows a diagram of the power plant and energy storage system of the present invention.

The power plant and energy storage system of the present invention is represented in FIG. 1. A power plant 20 for generating electricity is located on land 14. The energy storage system includes a storage reservoir 30 located on the bottom surface 13 of a body of water 12. The storage reservoir 30 is preferably made of concrete and reinforced by steel in order to allow for a relatively low pressure to exist inside the reservoir 30 under the influence of the high pressure from the body of water 12. Concrete can withstand very high compression forces. The storage reservoir 30 is preferably cylindrical in shape in order to withstand high compression forces.

The power plant drives an air compressor 21 connected to the reservoir 30 through a compressed air line 22. The tank 30 includes an inner space 31 and a water outlet pipe 32 connected at one end to the bottom of the concrete tank 30 and open on the opposite end into the body of water 12 near the tank 30 the compressed air line connects the compressor and the turbine to the tank 30 to discharge compressed air from the tank and supply compressed air to the tank 30. A turbine 25 is connected to drive an electric generator 26. An electric motor 27 drives the compressor 21. Electrical power to drive the motor 27 is available from the main power plant 20. A control valve 24 is connected in the compressed air line 22 to open or close the line 22 to air flow.

The system operates as follows. During low load demand, the power plant drives the electric motor 27 which drives the compressor 21 to supply compressed air to the tank 30 through the compressed air line 22 in order to displace water within the space 31. During the compressor operation, the control valve 24 is opened to allow for the compressed air to flow into the tank 30. The compressed air pushes the water out of the tank 30 and into the ocean or body of water through the water outlet pipe 32. When the tank 30 is empty, the control valve 24 is closed and the compressor 21 is stopped. The tank is now drained of water and full of compressed air and functions as an energy storage unit. Sensors can be used within the tank 30 in order to detect the water level for use in controlling the system. Additional control valves (not shown) are connected in the compressed air line 22 between the control valve 24 and the compressor 21 and the turbine 25 in order to direct the compressed air flow out from or into the compressor/turbine assembly to operate the energy storage and retrieval system.

At peak loads of the power plant 20, the potential energy of the system can be extracted. With the tank 30 empty or near empty, and the high pressure pushing on the tank due to the deep water, a high pressure differential exists that is available for producing energy. The control valve 24 is opened to allow water to flow through the outlet pipe 32 and into the tank 30 and displace the compressed air stored within the tank 30. The compressed air flows out from the tank 30 through the compressed air line 22 and into the turbine 25 to drive the generator 26 and produce electrical power. The compressed air within the tank 30 maintains a high level of compression due to the force of the external water source acting on the air within the tank through the outlet pipe 12.

The system of the present invention shows a single tank 30 used. However, multiple tanks 30 can be used in order to increase the space 31 to be used for power storage and production. Also, the tank could be vertically aligned instead of horizontally aligned as shown in the figure. Materials other than concrete can be used to form the storage tank 30. The main point being that the tank must be capable of withstanding the high pressure from being submerged in deep water. The deeper the water, the more energy can be stored. Also, the higher pressure differential will provide for improved turbine performance. The system using the concrete tank 30 also allows for easy installation since the tank can be made on land near water and transported by a barge to the desired location, and then lowered into the water.

Besides a concrete tank, another high pressure storage reservoir could be used with the power plant of the present invention. An old submarine body could be sunk and connected by the outlet pipe and the compressed air line to the power plant to produce the same high pressure compressed air storage as the concrete tank. The high pressure storage tank is also intended for use in a power plant in which deep water can be found close enough to the power plant so that the losses within the compressed air line will not result in a low efficiency for the power plant.

I claim the following:

1. A power plant for generating electric power comprising:
    a high pressure tank capable of supporting a low pressure inside the tank when a very high pressure exists outside of the tank;
    a fluid outlet pipe connecting the tank inside to a high pressure outside of the tank such that the high pressure fluid can flow into and out of the tank;
    a compressor connected to a motor to drive the compressor;
    a turbine connected to an electric generator to drive the electric generator;
    a compressed fluid line connecting the tank to the compressor and turbine such that compressed fluid from the compressor will discharge fluid from the tank and compressed fluid from the tank will drive the turbine to produce electric power; and,
    the tank is located in a deep water body close to the power plant.

2. The power plant of claim 1 and further comprising:
    the tank is a reinforced concrete cylinder.

3. The power plant of claim 1 and further comprising:
    a control valve connected in the compressed fluid line between the tank and the compressor and turbine, the control valve operating to prevent the compressed fluid from the tank from flowing into the turbine when the control valve is not opened.

4. The power plant of claim 1 and further comprising:
    the fluid outlet pipe is connected near a bottom of the tank; and,
    the compressed fluid line is connected near a top of the tank.

5. The power plant of claim 1 and further comprising:
    the compressor and the turbine are located on land while the tank is located offshore in the body of water.

6. A process for producing electric power at peak loads of a power plant and storing energy produced form the power plant at low loads, the process comprising the steps of:
    locating a high pressure storage tank in a body of water near to the power plant;
    equalizing the pressure inside the storage tank with the deep water pressure outside of the storage tank;
    forcing the high pressure water out from the storage tank with a second pressurized fluid at low loads using electrical energy produced from the power plant; and,
    driving a turbine and electric generator with the high pressure second fluid during high demands to produce electrical power to supplement the power plant.

7. The process for producing electric power of claim 6, and further comprising the step of:
    driving a compressor to compressor air as the second high pressure fluid for storage in the tank.

8. The process for producing electric power of claim 7, and further comprising the step of:
    forcing the high pressure water out from the bottom of the storage tank with the high pressure compressed air supplied to the storage tank from the top of the tank during the low loads.

* * * * *